Oct. 9, 1928.
R. T. PIERCE
1,686,638
SLIP INDICATOR
Filed March 24, 1921
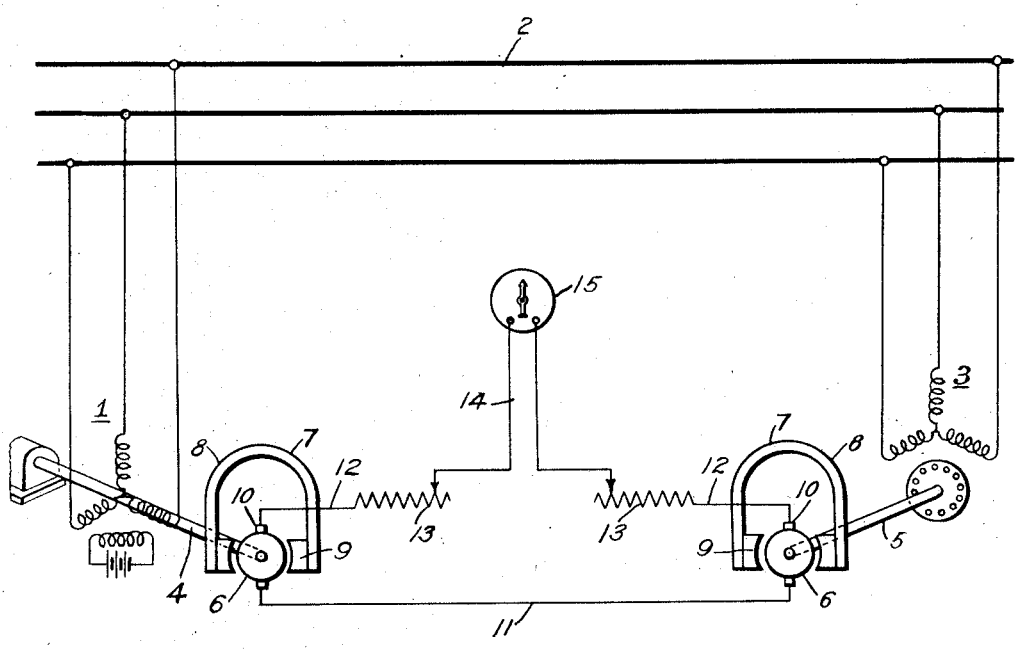
WITNESSES:
INVENTOR
Raymond T. Pierce
BY
ATTORNEY Patented Oct. 9, 1928

1,686,638

UNITED STATES PATENT OFFICE.

RAYMOND T. PIERCE, OF SWISSVALE, PENNSYLVANIA, ASSIGNOR TO WESTINGHOUSE ELECTRIC & MANUFACTURING COMPANY, A CORPORATION OF PENNSYLVANIA.

SLIP INDICATOR.

Application filed March 24, 1921. Serial No. 455,250.

My invention relates to indicating means and particularly to devices or systems for indicating the percentage of slip between an alternating-current generator and an induction motor.

The object of my invention is to provide means of the above indicated character that shall employ a direct-reading instrument and that shall be simple in construction and effective in operation.

The single figure of the accompanying drawing is a diagrammatic view of a system embodying my invention.

An alternating-current generator 1 supplies current, through circuit conductors 2, to an induction motor 3.

The shafts 4 and 5 of the generator and the motor, respectively, support armatures 6 of similar magnetos 7 that further comprise field frames 8, pole members 9 and brushes 10 for the armatures 6. The armatures 6 are connected in series with each other, through the brushes 10, a conductor 11, conductors 12, adjustable resistors 13, conductors 14 and a voltmeter or similar instrument 15.

In operation, the magneto on the generator shaft generates an electromotive force in proportion to the frequency of the generator and the magneto on the motor shaft generates an electromotive force in proportion to the speed of the motor. These electromotive forces oppose each other and, when the motor is running at synchronous speed, are equal. Consequently, the voltmeter pointer will register a zero or neutral indication.

When the motor is not running at synchronous speed, the electromotive forces generated by the magnetos are not equal and, consequently, the voltmeter pointer will be deflected in direct proportion to the slip.

Since the generator speed remains constant, the variable resistors 13 may be adjusted to apply a different voltage to the voltmeter when the number of poles on the motor is changed to vary the speed of the motor, as in the speed control of battleships.

While I have shown and described a preferred form of my invention, it is obvious that various changes and modifications may be effected therein without departing from the spirit and scope of the invention.

I claim as my invention:

1. The combination with a plurality of movable members comprising an alternating current generator and an induction motor of means responsive to movement of each of said members for effecting an electromotive force in accordance with movement thereof, and a single circuit including an electro-responsive indicating device traversed by an electromotive force proportional to the difference between said first electromotive forces for actuating the indicating means.

2. The combination with an alternating-current generator and a motor connected in circuit therewith, of a pair of devices connected one to the generator and one to the motor and responsive to operation thereof for effecting electromotive forces in accordance with movement of the movable members of the generator and motor, respectively, and a single circuit including an electro-responsive indicating device in which said forces are differentially combined to actuate the indicating means.

In testimony whereof, I have hereunto subscribed my name this 14th day of March, 1921.

RAYMOND T. PIERCE.